United States Patent [19]

Byers et al.

[11] Patent Number: 5,423,030
[45] Date of Patent: Jun. 6, 1995

[54] BUS STATION ABORT DETECTION

[75] Inventors: Larry L. Byers, Apple Valley; Joseba M. Desubijana, Minneapolis; Wayne A. Michaelson, Circle Pines, all of Minn.

[73] Assignee: Unisys Corporation, Blue Bell, Pa.

[21] Appl. No.: 120,093

[22] Filed: Sep. 13, 1993

[51] Int. Cl.⁶ ............................................. G06F 11/34
[52] U.S. Cl. ................................. 395/575; 371/29.5; 364/927.93; 364/935.4; 364/DIG. 2; 364/240; 364/242.92; 364/DIG. 1
[58] Field of Search ............... 395/575, 200, 250, 325, 395/500, 750, 775; 364/927.93, 935.4, 222.2, 240, 242.92; 371/8.1, 8.2, 29.5

[56] References Cited

U.S. PATENT DOCUMENTS

| | | | |
|---|---|---|---|
| 4,168,469 | 9/1979 | Parikh et al. | 325/38 R |
| 4,529,895 | 7/1985 | Garverick et al. | 307/473 |
| 4,535,453 | 8/1985 | Rhodes et al. | 370/110.1 |
| 4,570,091 | 2/1986 | Yasuda et al. | 307/583 |
| 4,825,438 | 4/1989 | Bennett et al. | 371/8.1 |
| 4,933,579 | 6/1990 | Isobe et al. | 307/592 |
| 4,961,192 | 10/1990 | Grimes | 371/37.1 |
| 5,210,449 | 5/1993 | Nishino et al. | 307/473 |
| 5,212,800 | 5/1993 | Mensch, Jr. | 395/800 |

Primary Examiner—Robert Beausoliel, Jr.
Assistant Examiner—Bieu-Minh Le
Attorney, Agent, or Firm—Glenn W. Bowen; Charles A. Johnson; Mark St. Starr

[57] ABSTRACT

A bus control and error detection system is provided for a bus system in which data and address signals are transferred between a microsequencer and a number of operational stations which are coupled to the bus. Tri-state drivers are employed in the microsequencer and in the stations which are constructed such that two of the three states of these tri-state drivers are utilized to provide the two states of binary logic operation, and the third state is a high impedance state that protects the components that are coupled to the bus during predefined abort condition which are detected in the system. An abort detection circuit is included in each of the operational stations which is coupled to receive control signals from the microsequencer and which is constructed to emit an ABORT signal output to the microsequencer when the control signals indicate that an abort condition has occurred for the associated operational station. The ABORT signal causes the tri-state driver in the microsequencer to switch to its high impedance state and the microsequencer and transmit LOCK BUS signals to all of the operational stations in order to switch their tri-state drivers to their high impedance states.

3 Claims, 3 Drawing Sheets

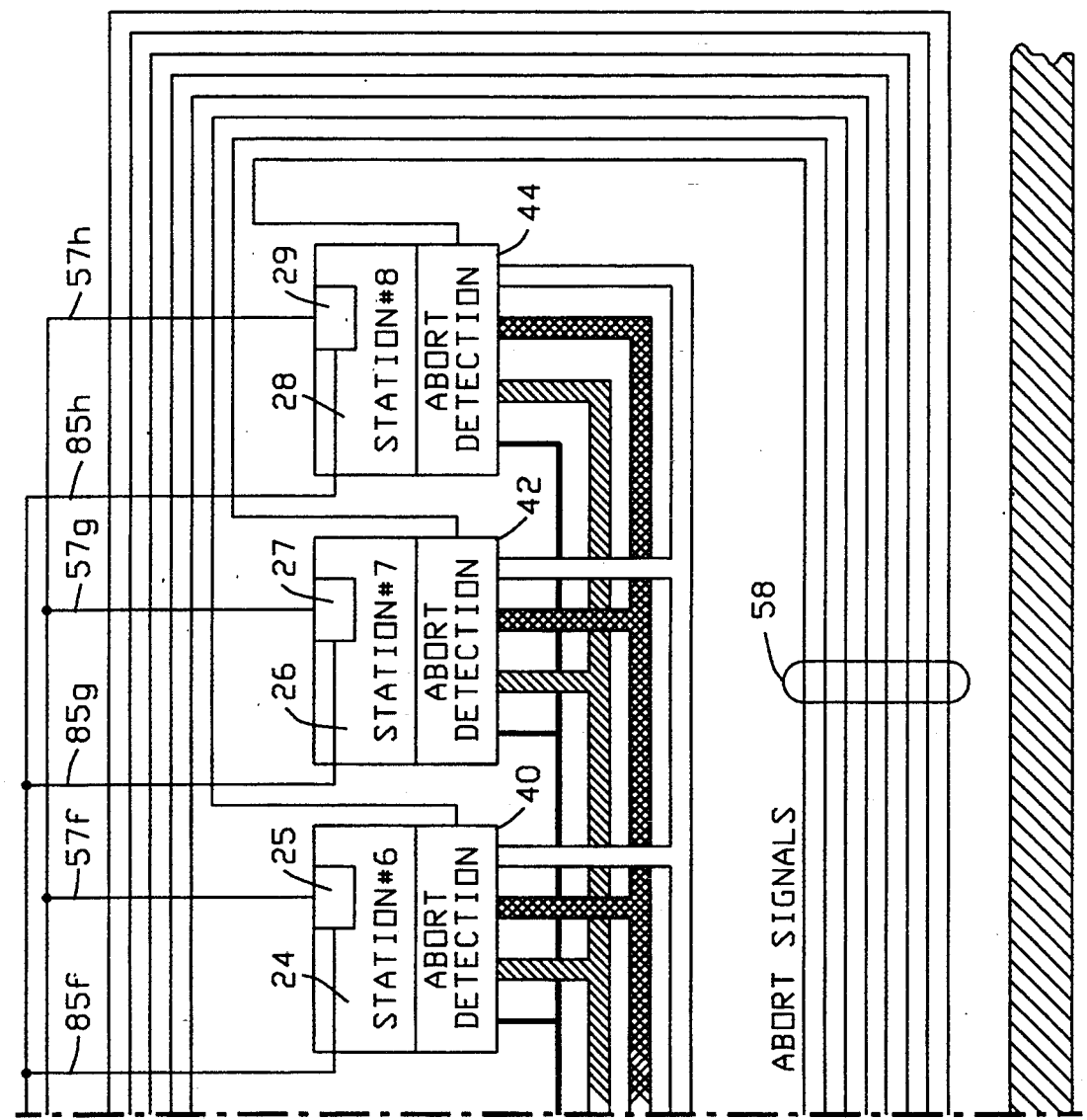

BUS STATION ABORT DETECTION

BACKGROUND OF THE INVENTION

1. Field of the Invention

The invention is related to the detection of errors in digital computing systems, and more particularly to the detection of errors in a number of stations which are interconnected by a bus that carries address and data to a processor or sequencer and the stations. The stations may be independent sequencers or processors, or they may be gate arrays each of which have a specified function which is called into operation by signals from the processor or sequencer.

It is common to employ "handshake" signals between a processor or sequencer and operating stations, such as gate arrays, to control the exchange of data and address signals. The detection of errors that occur in large scale processing systems which employ handshake to changes and which have a number of stations is critical in order to avert damage to system components, especially to expensive circuit elements and gate arrays which could fail due to hardware failures in other areas. The system employs a tri-state bus driver. Tri-state buses and bus drivers are well known. U.S. Pat. No. 5,212,800, issued May 18, 1993 in the name of William D. Mensch, Jr., entitled "Method and Apparatus for Sensing Trinary Logic States in a Microcomputer Using Bus Holding Circuits," and U.S. Pat. No. 5,210,449, issued May 11, 1993 in the names of Kiyoshi Nishino, et al., entitled "Edge-Triggered Tri-State Output Buffer," show examples of such types of devices. A tri-state bus has two logic states and a third state which is a high impedance state. When the bus is set into its third state, it protects components from failed components and from also failing.

SUMMARY OF THE INVENTION

An abort detection circuit for inclusion in each operational component of a multi-component system in which these components are interconnected through a bus that is under the control of a controller is provided by a logic circuit that receives from the controller:

(1) a first signal that designates a particular operational component when the controller is requesting the receipt of data from that particular component, (2) a second signal that designates a particular operational component when the controller is requesting the transmission of data to that particular operational component, and (3) a third signal that is active when data signals are being transmitted on the bus from any of the operational components.

The abort detection circuit provides an ABORT signal to the controller when any of the following conditions occur, (1) the first signal is initiated while the third signal is active, or (2) the second signal is initiated while the third signal is inactive and an addressing signal is active to the operational component that is supplying an ABORT signal, or (3) the first signal is initiated when the addressing signal is inactive to the operational component that is supplying an ABORT signal.

The controller and the operational components all have their own tri-state drivers coupled to supply data signals to the bus. The tri-state driver in the controller switches to its high impedance protective state upon the receipt of any ABORT signal and sends a LOCK BUS signal to all of the operational components which causes all of the tri-state drivers in the operational components to switch to their high impedance protective state.

BRIEF DESCRIPTION OF THE DRAWINGS

FIG. 1 is a diagram which shows the arrangement of FIGS. 1a and 1b with respect to each other, FIGS. 1a and 1b are a block diagram of an embodiment of the processing system which employs a microbus, a microsequencer and eight separate gate array stations that are coupled to exchange control data signals with the microsequencer.

DETAILED DESCRIPTION OF THE INVENTION

Figure 1A:
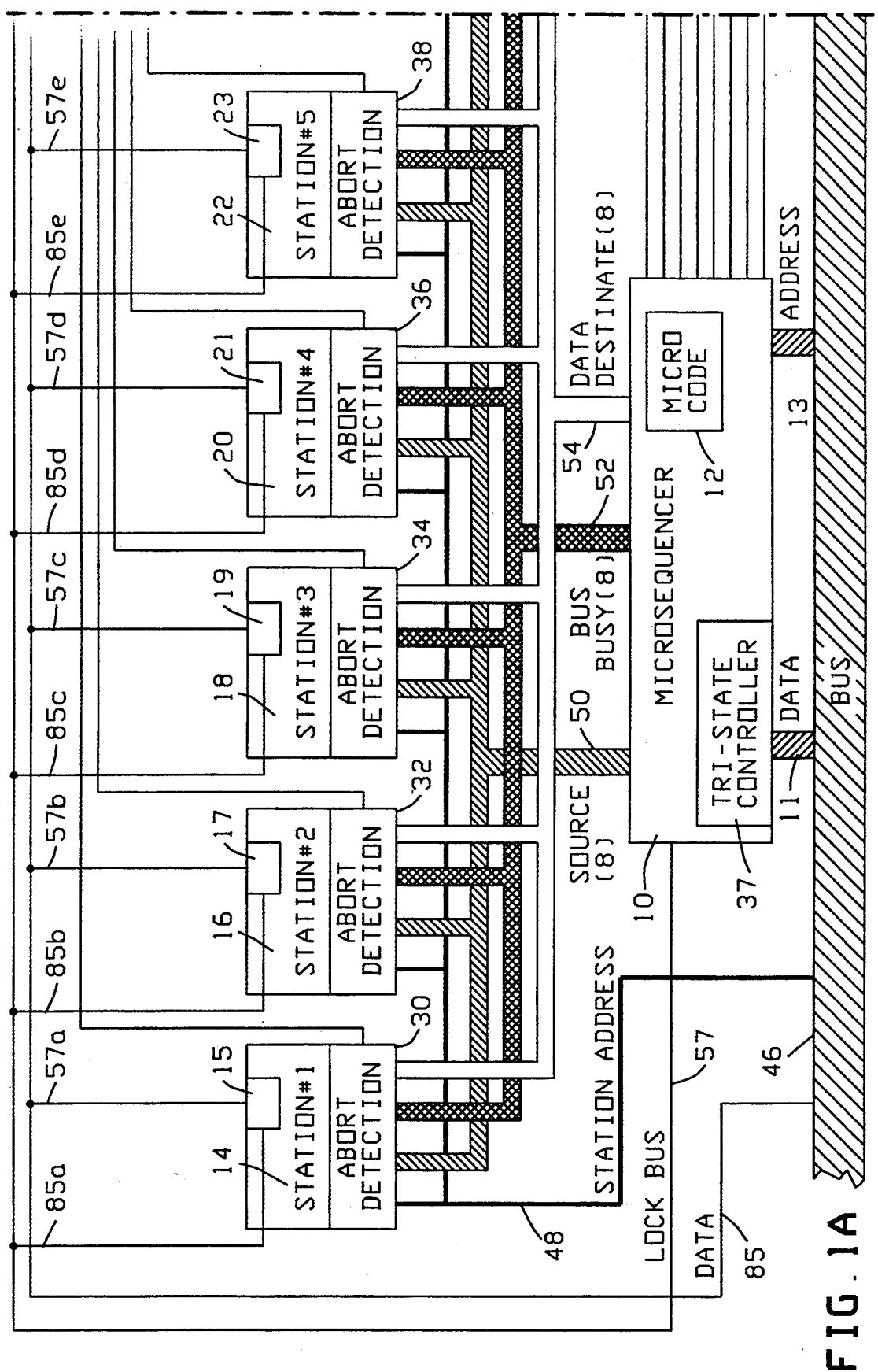

Referring to FIGS. 1a and 1b, a microsequencer executes microcode 12 in a manner well known in the art to couple data and address signals embedded between the stations numbered 1 through number 8 which are identified with the numerals 14–28, respectively. The microsequencer is preferably a microprocessor which executes micro code instructions that control and monitor the transfer of data within the system. Each of the stations 14–28 has its own abort detection circuit 30–44. A bidirectional micro bus 46 is employed in the system which may connect to other buses or other input/output or processing devices (not shown). The micro bus includes both a data bus and an address bus which allows data and address signals to be coupled into and out of the microsequencer 10 on the lines 11 and 13, respectively. The stations 14–28 are connected to the micro bus through the station address bus 48.

In the described embodiment, the station address bus 48 needs only three lines since a decoding device is employed in each of the abort detection circuits 30–44. The illustrated embodiment also shows eight lines labelled "SOURCE" which are interconnected between the stations and the microsequencer and eight BUS BUSY lines 52 and eight DATA DESTINATE lines 54 which are similarly interconnected between the microsequencer 10 and the processing stations 14–28. In the illustrated embodiment the SOURCE BUS BUSY and DATA DESTINATE signals are broadcast by the microsequencer 10. It is understood, however, that each of these groups of lines could alternately each consist of only three lines if decoders for each set of these lines were included in the abort detection circuits, as is the decoder for the station address lines. The manner of decoding and sending signals between the stations and the microsequencer or microprocessor is not critical with respect to the present invention.

The bus is a tri-state bus and each station includes a tri-state controller, such as the controllers 15–29, each of which is coupled to the micro bus to receive data over the lines 57 and the lines 57(a)–57(h). The microsequencer 10 contains a tri-state controller 37 which is coupled to the data lines 11 to supply data thereto, while the stations 14–28 each have their own tri-state driver coupled to the data lines 57(a)–57(h) to supply data to the bus 46. The abort detection circuits 30–44 detect when particular types of errors occur. The abort detectors 30-44 are each coupled to a unique abort line of the lines 58 that are coupled to the microsequencer so that each of the stations may be independently monitored. When an ABORT signal is sent on any of the lines 58 to the microsequencer 10, it responds by transmitting a LOCK BUS signal to all of the stations on the lines 85. Upon receipt of the LOCK BUS signal the tri-state bus drivers in the stations 14-28 are switched from being operable in one or the other of their logic states to a high impedance state to protect the components that coupled to the data bus via the lines 57.

Figure 2:
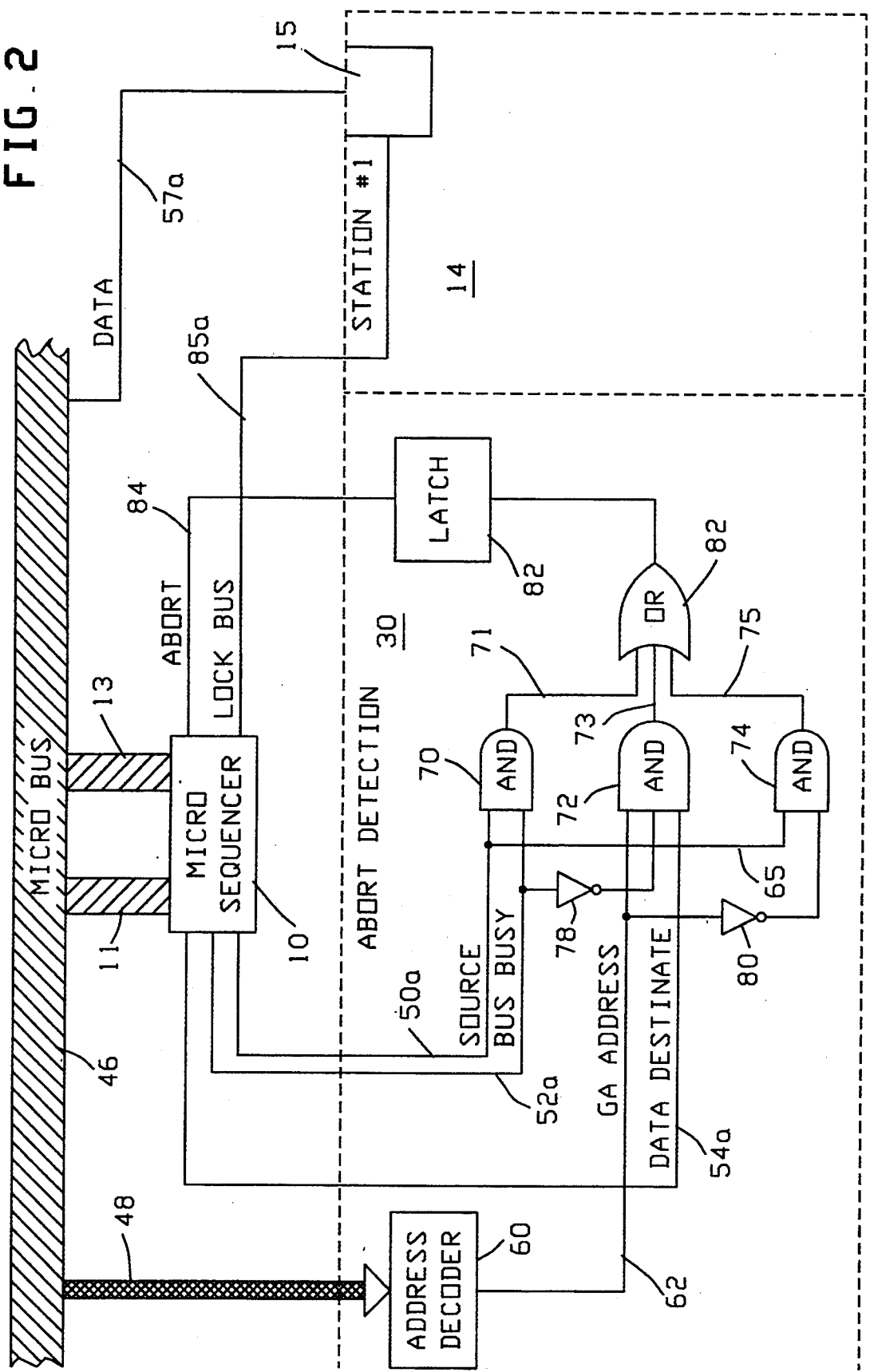
FIG. 2 is a logic schematic of an abort detection circuit which is located in each of the stations of the system of FIGS. 1a and 1b and is coupled to exchange signals with the microsequencer.

FIG. 2 is a schematic representation of the abort detection circuit which is present in each of the stations. Some of the same elements that are shown in FIGS. 1a and 1b also appear on FIG. 2 and have the same element numbers as they had in FIGS. 1a and 1b. As previously noted, the three-bit address code is taken from the micro bus 46 and passed on the micro bus lines 48 to the abort detection circuits, such as the abort detection circuit 30 that is associated with station 14, for example. The other details of station #1 (i.e., station 14) are not shown in FIG. 2 since they are not critical to the present invention.

The address decoder 60 for the abort detection circuit 30 takes the three incoming bits on the bus 48 and translates them to a single output gate array signal or GA ADDRESS on the line 62, and the associated station is the one that is selected. As previously noted, the SOURCE, the BUS BUSY and the DATA DESTINATE signals are broadcast by the microsequencer. Thus, only a single line is required for each station to conduct these signals in the described embodiment. The line 50(a) conducts the SOURCE signal from the microsequencer to the abort detection circuit 30 while the line 52(a) transmits the BUS BUSY signal, and the line 54(a) transmits the DATA DESTINATE signal. These four signals are then utilized to detect if any of three error conditions have occurred. If any one of these three error conditions has occurred, an ABORT detection signal is sent back to the microsequencer 10 to halt its operation. The circuitry employed in the abort detection circuit 30 is uncomplicated and inexpensive. It consists merely of three AND gates 70, 72, 74 an OR gate 76, two inverters 78, 80, and a latch circuit 82.

The SOURCE signal from the electrical sequencer is activated and is sent to the abort detection circuit 30 whenever the microsequencer 10 wants to receive data from a particular station which is the "source" of that data. Since the SOURCE signal is sent to all of the abort detection circuits 30-44, it is necessary that the address decoders 60 of the stations 14-28 be supplied with a GA ADDRESS (gate array address). The microsequencer also sends out an appropriate BUS BUSY signal whenever any one of the eight stations 14-28 or the microsequencer 28 has put data on the bus 46. If the microsequencer 10 is driving the bus, the BUS BUSY signals to all of the stations are active. If a station is driving the bus, its BUS BUSY signal is inactive while the BUS BUSY signals of the remaining stations are active. The DATA DESTINATE signal is originated by the microsequencer 10 when it wants to send data to a particular station so that the station is a "destination" for the data. The microsequencer will then activate the DATA DESTINATE signal for all stations.

The source signal and the BUS BUSY signals are supplied as inputs to the AND gate 70 and each of the abort detection circuits. The BUS BUSY signal is also inverted by the inverter 78 and is supplied to one input of the three-input AND gate 72. Other inputs to the AND gate 72 also receive the GA ADDRESS signal on the line 62 and the DATA DESTINATE signal on the line 68. A third AND gate is coupled so that it has one input coupled to receive the SOURCE signal, and its other input is coupled to receive the inverted version of the GA ADDRESS signal after it has passed with another inverter 80. Thus, the first AND gate 70 will be satisfied when there is a simultaneous detection of an active source signal and active BUS BUSY signal. This condition detects the error condition that one station is already on the bus and another station is trying to activate the source where the bus is already busy.

In a similar manner, abort detection is required when there are not simultaneous active BUS BUSY and active DATA DESTINATE signals for a station that was addressed by the GA ADDRESS signal. For a station to receive data, there must be some data on the bus when a station is being addressed to receive data. To accomplish detection of error condition, the BUS BUSY signal is passed through the inverter 78, and it is then coupled to one input of the AND gate 72. The DATA DESTINATE signal on the line 60 is also coupled to an input of the AND gate 72, as is the line 62 which carries the GA ADDRESS signal that indicates that the station in consideration has been addressed.

The AND gate 74 has one input coupled to receive the SOURCE signal from the lines 64, 65. An inverter 80 inverts the GA ADDRESS signal and supplies it to the other input of the two-input AND gate 74. The gate 74 detects the error condition that can occur when the GA ADDRESS signal does not indicate that the station in question has been addressed, but the SOURCE signal is requesting that station to transmit data. All of these three above-stated abort conditions generate signals on the output lines 71, 73, 75 of the gates 70, 72 and 74, respectively, when they occur. The lines 71, 73, 75 are each coupled to an input of the three-input OR gate 76, the output of which is coupled to set a latch 82. When any of these signals pass through the OR gate 76 to the latch 82, the latch is locked and produces an output ABORT signal which appears on the line 84 that is coupled back to the microsequencer 10. An ABORT signal to the microsequencer from any one of the stations will cause the microsequencer to switch its tri-state driver 37 to its high impedance state and to send LOCK BUS signals on the cable 85 to the lines 85(a)-85(h). The tri-state drivers 15 in the stations 14-28 upon receipt of the LOCK BUS signal will switch to their high impedance protective state.

The present invention, therefore, monitors the operation of the bus system to insure that data is not transmitted or received if a station is incorrectly addressed and prevents failures from occurring when a bus attempts to transmit and receive data simultaneously so that damage to the expensive and critical gate arrays or other components is prevented.

We claim:

1. In bus control and error detection system that comprises a bus means for carrying both data and address signals to components coupled to said bus means, wherein said components comprise control means coupled to said bus means for receiving from said bus means, and for transmitting to said bus means, both data and address signals, and said system further comprises a plurality of operational means coupled to said bus means for receiving from said bus means, and for transmitting both data and address signals to said bus means, under the control of said control means, each of said operational means being constructed to perform specified data processing operations that produce processed data results and to transmit said processed data results of said operations over said bus means, wherein each of said control means and said operational means comprises a tri-state driver means having first, second and third states that is coupled to said bus means and constructed to control the transmission of data signals to said bus means and is constructed such that the first and second states of the three states of said tri-state driver means are utilized during normal operation to provide said first and second states of binary logic data signals, and said third state is an impedance state that protects the components that are coupled to said bus means during predefined abort conditions that occur in said system, the improvement wherein (A) said control means is constructed to provide the following signals to all of said operational means:
  (1) a first signal that designates a particular operational means when said control means is requesting receipt of data from said particular operational means,
  (2) a second signal that designates a particular operational means when said control means is requesting transmission of data to said particular operational means,
  (3) a third signal that is active while any data signals are being transmitted on said bus means from any of said operational means, and (B) each of said operational means comprises an abort detection means for supplying an abort signal to said control means upon detection of an error condition, and said abort detection means each comprise a logic circuit means that is coupled to said control means to receive said first, second and third signals, and a fourth signal that is supplied by said bus means which when active specifies which of said logic circuit means has been addressed, wherein each of said logic circuits is constructed to provide an abort signal to said control means when any of the following conditions occur:
  (1)(a) said first signal is initiated while said third signal is active, or
    (b) said second signal is initiated while said third signal is inactive and said fourth signal is active to said operational means that is supplying said abort signal, or
    (c) said first signal is initiated when said fourth signal is inactive to said operational means that is supplying said abort signal, and
  (2) said control means is constructed such that upon receipt of an ABORT signal by said control means, its tri-state driver means will switch to said third state, and said control means will transmit a LOCK BUS signal to all of said operational means, and
  (3) all of said operational means are constructed such that upon receipt of said LOCK BUS signal each of said tri-state driver means of said operational means will switch to their high impedance state.

2. In a bus control and error detection system as claimed in claim 1 the further improvement wherein said control means comprises address decoder means that is constructed to decode said address signals and to supply a single decoded address line to each of said operational means and to one of said logic circuit means for supplying said fourth signals thereto.

3. In a bus control and error detection system as claimed in claim 1 the further improvement wherein each of said operational means comprise their own address decode means coupled to receive a plurality of code bits as address signals which are constructed to supply a single decoded address line in each of said operational means to its associated one of said logic circuit means for supplying said fourth signals thereto.

* * * * *